United States Patent Office 3,442,529
Patented May 6, 1969

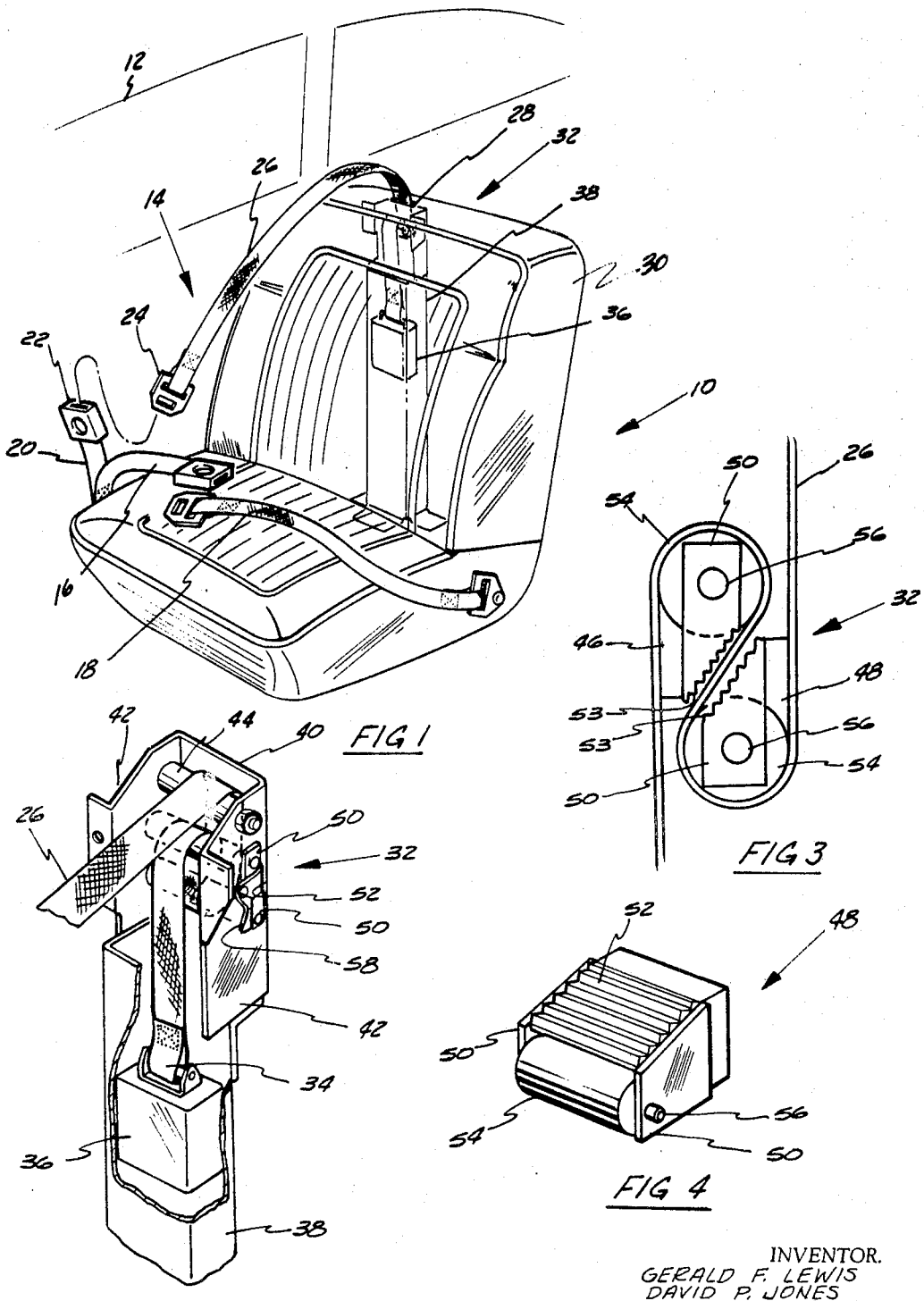

3,442,529
INERTIA RETRACTING DEVICE WITH WEIGHT ACTUATED TAKE-UP
Gerald F. Lewis, Berkley, David P. Jones, Detroit, and Ronald J. Palmieri, Harper Woods, Mich., assignors to Jim Robbins Seat Belt Co., Royal Oak, Mich.
Filed Apr. 24, 1967, Ser. No. 633,014
Int. Cl. B60r *21/10*
U.S. Cl. 280—150                                    6 Claims

ABSTRACT OF THE DISCLOSURE

A vehicle safety belt assembly having a counterweight attached to the stored end of a section of webbing. The counterweight is slidably mounted in an upright storage tube and biases the webbing toward a stored position, but permits the webbing to be extended from the stored position in response to a nominal pull-out force.

The webbing is threaded around and between a pair of movable, cooperating clamping members. A pull-out force producing an excessive feed-out rate causes the clamping members to approach one another and lock the webbing to the vehicle to prevent further extension of the webbing.

BACKGROUND OF THE INVENTION

Field of the invention

This invention relates to automatic retracting devices for vehicle safety seat belt assemblies and more specifically to a safety seat belt having a counterweight retracting member mounted in an upright storage tube to bias the webbing toward a stored position but normally permitting a free extension of the webbing in response to a nominal pull-out force, and a pair of cooperating clamping members operable in response to an excessive feed-out rate of the webbing to clamp the webbing to the vehicle.

Description of the prior art

Automatic locking retractors are receiving considerable interest as a means for mounting a vehicle safety seat belt assembly so that the movements of the occupant of the seat belt assembly are not restricted unless an abnormal situation arises which causes seat belt locking means to prevent extension of the belt from its stored position. Conventional retracting devices comprise a spring biased wind-up reel mounted to a fixed part of the vehicle. The terminal end of the belt is tattached to the wind-up reel and is normally biased toward a wound-up stored position but freely is extendible from the wound-up position by the application of a nominal pull-out force on the cupant. When sudden and violent forces acting on the vehicle cause the occupant to be displaced with respect to his seat, the webbing commences to extend from its wound-up stored position at a sharply increased rate, so that the wind-up reel rotates at an abnormal rate. A locking mechanism normally forming a part of a wind-up reel and including either an enertia or centrifugally actuated member acts in response to the excessive acceleration of the wind-up reel to lock the reel against rotation.

Conventional automatic locking retractors of the aforementioned type have generally received a poor commercial acceptance because of a number of inherent drawbacks. The wind-up reel, and the locking components require a number of expensive elements which are costly to manufacture and difficult to assemble. In addition, locking devices which are dependent for their actuation upon rotation of the wind-up reel are difficult to adjust so that they operate within an acceptable range of feedout rates. Furthermore, reel type wind-up retractors having a pre-tensioned spring member biasing the webbing toward the stored wound-up position do not provide a uniform biasing force on the belt as the belt is extended from its stored position. This is because of the inherent non-linear characteristics of the stress-deflection curves of the springs employed in such units.

It is the broad purpose of the present invention to provide an automatic retracting assembly for a seat belt assembly which provides a uniform retracting force at all times and which has a belt-clamping means separate from the movement of the retracting means and activated by the movement of the webbing from its stored position.

SUMMARY

The preferred embodiment of the present invention, which will subsequently be described in greater detail, is described with reference to a seat belt assembly having an upper torso section of webbing or belt arranged with a lower half anchored to the seat or other fixed portion of the vehicle and joined to an upper half which extends from a storage area in the back portion of the seat. A counterweight is attached to the end of the upper half and is slidably disposed in an upright storage tube mounted within the seat back. The webbing extends from the upper end of the storage tube and through a locking device also mounted in the seat back.

The counterweight has a mass such that it normally applies a tensile force on the belt to urge the belt toward a stored position within the storage tube. A pull-out force applied by the occupant of the seat belt assembly as he leans forward from his seated position to perform various motions extends a sufficient length of webbing from the storage tube to accommodate these motions. However, when the occupant resumes his upright position the counterweight moves downwardly to absorb any slack in the webbing. It can be seen that by using a counterweight arrangement, the preferred retracting device does not only provide a uniform force on the webbing regardless of how much of the webbing has been extended from this storage tube, but the simplicity of this arrangement provides an inherently reliable means for retracting the webbing.

The clamping means preferably takes the form of upper and lower cooperating clamping members which are mounted to the seat back and which are movable toward and away from one another between a webbing-clamping position and a webbing-release position. A roller member is mounted on each of the clamping members. The webbing extends upwardly from the counterweight and around the roller of the upper clamping member between the clamping sections of the clamping members, around the roller of the lower clamping member and up toward a guide roller. A spring element biases the clamping members away from one another so that the belt is normally freely movable between the clamping members as it moves between its stored position and its extended position.

A pull-out force acting to extend the webbing from its stored position tends to move the clamping members toward one another. A force producing an excessive belt feed-out rate such as that produced by a violent external force acting on the vehicle and tending to displace the occupant from his seat, causes the clamping sections of the clamping members to engage the webbing and lock it to the vehicle to prevent further extension. When the force has been dissipated, the spring bias member moves the clamping members toward their spaced apart position so that the webbing is again extendible from its stored position.

It is therefore an object of the present invention to provide means for retracting a section of webbing of a vehicle safety seat belt assembly toward a stored position by providing a storage area, means guiding the webbing toward the storage area so that the stored end of the webbing is movable between raised and lowered positions, and a counterweight member having a predetermined mass attached to the stored end of the belt, the counterweight member producing a tensile force on the webbing and biasing the webbing toward the stored position.

It is another object of the present invention to provide means for locking a section of webbing of a vehicle safety seat belt assembly which is normally freely extendible from a stored position by providing a pair of cooperating clamping members supported to a fixed part of the vehicle for movement toward and away from one another; means biasing the clamping members toward a spaced apart webbing-release position and means guiding the webbing between the clamping sections of the clamping members and operable in response to the webbing moving at a predetermined feed-out rate to produce a force on the clamping members so that they approach one another to lock the webbing to the vehicle.

It is a still further object of the present invention to provide an automatic locking device for clamping the webbing of a retractable safety seat belt assembly to the vehicle upon the occurrence of forces tending to suddenly and violently displace the occupant from his seated position and which is operable independently of the retracting means.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which:

FIGURE 1 is a perspective view of a vehicle assembly for providing restraint forces on an occupant and showing a counterweight retracting device and automatic clamping means illustrating the preferred embodiment of the present invention;

FIGURE 2 is an enlarged view of the clamping means and counterweight with parts broken away for purposes of clarity;

FIGURE 3 is an enlarged view of the clamping members of FIGURE 1 with parts removed to illustrate the path of the webbing; and FIGURE 4 is a perspective view of one of the clamping members.

DESCRIPTION OF THE PREFERRED EMBODIMENTS

Now, referring to FIGURE 1, a seat assembly 10 is illustrated as mounted within a vehicle 12 and has a seat belt assembly 14. The seat belt assembly 14 includes a pair of lap sections 16 and 18 which are normally joined together to provide a lap restraint for the occupant of the seat 10. A webbing section 20 having its lower end fixedly attached to the seat 10 has a buckle section 22 engageable with a tongue section 24 carried by an upper webbing section 26. When the webbing sections 20 and 26 are joined together, they form an upper torso restraint for the occupant of the seat 10.

The webbing 26 extends through an opening 28 in the back supporting portion 30 of the seat 10 to pass over the shoulder of the occupant. The webbing 26 is threaded through a clamping means 32 and extends downwardly with its lower end 34 attached to a counterweight member 36 having a predetermined mass.

A rectangular, elongated, upright storage tube 38 with a lower end rigidly attached to the frame of the seat 10 has its upper end spaced below and aligned with the opening 28 in the seat. The counterweight 36 preferably has a rectangular cross section slightly less than the inner cross section of the storage tube 38. Thus, the counterweight 36 is received by the storage tube 38 and is slidably movable between raised and lowered positions therein. It can be seen that the counterweight 36 applies a tensile force on the webbing 26 which tends to bias the webbing toward a stored position within the storage tube 38. The mass of the counterweight 36 is selected such that the occupant of the seat can extend a section of webbing from the storage tube 38 by a nominal pull-out force so that his movements are relatively unrestricted. When the pull-out force is released, the counterweight 36 absorbs any slack in the webbing 26 by retracting the slackened portion of the webbing into the storage tube 38.

It can be seen that the counterweight 36 applies a uniform retracting force regardless of the amount of webbing 26 that has been extended from the storage tube. It can further be seen that this counterweight retracting arrangement is extremely reliable because of the absence of complicated working components such as are required in conventional retracting means.

As best seen in FIGURE 2, a bracket 40 having a pair of spaced parallel side sections 42 is rigidly attached to the upper end of the storage tube 38 and below the opening 28 of the seat assembly 10. A guide roller 44 is rotatably supported on the side sections 42 preferably immediately adjacent the opening 28. The roller 44 is rotatable about an axis transverse to the movement of the webbing 26 between its extended and stored positions.

The clamping means 32 is mounted on the bracket 40 and includes an upper clamping member 46 and a lower clamping member 48. The clamping members 46 and 48 are similar to one another and each includes side sections 50 which are slidably mounted in a vertical slot 52 formed in each side section 42 of the mounting bracket. The slots 52 have a length such that the clamping members 46 and 48 are vertically movable toward and away from one another. Each of the clamping members has a clamping section 53 preferably formed in a plane inclined with respect to the movement of the clamping members. The clamping sections are arranged so that they approach one another when the clamping members 46 and 48 move toward one another.

Referring to FIGURE 4, the lower clamping member 48 is shown separated from the other components of the locking means 32 and illustrates how each of the clamping members supports a roller 54 which is mounted to the slide portions 50. The rollers 54 each have a shaft 56 journaled in the slide portions 50. The peripheral surface of each roller is closely spaced adjacent the clamping section 53 so that when the upper and lower clamping members 46 and 48 are spaced apart, the webbing 26 is wrapped around the roller 54 of the lower clamping member 48, extends upwardly and around the roller member 54 of the upper clamping member 46 and then extends downwardly to the counterweight 36. In the spaced apart or webbing-release position indicated in FIGURE 3, the webbing 26 moves freely around the rollers 54 of the upper and lower clamping members and clears the clamping sections 53. The clamping members 46 and 48 are normally maintained in this spaced apart position by a spring element 58 anchored to each of the side sections 42 and having arms engaged with the outer ends of the shafts 56.

It can be seen that the webbing 26 preferably approaches the clamping means 32 in a direction parallel to the axis of movement of the clamping members 46 and 48 and extends downwardly in a direction which is also parallel to the axis of movement of the clamping members 46 and 48. Thus, a pull-out force acting on the webbing 26 and tending to extend the webbing from its stored position causes the webbing to tend to straighten out so that it produces a force through the rollers 54, the shafts 56 and the side sections 50 which moves the clamping sections 53 toward one another. The spring elements 58 are chosen with a resiliency such that they maintain the upper and lower clamping members 46 and 48 in a spaced apart webbing-release position to accommodate pull-out forces associated with normal motions of the occupant of the seat belt assembly 14. However, the spring elements 58 deflect in response to an excessive feed-out rate of the webbing 26 so that the clamping sections 53 engage the webbing 26 therebetween and rigidly lock the webbing 26 to the bracket 40 and against further extension with the two clamping members abutting the upper end of slot 52. When the force producing the excessive feed-out rate has been dissipated or otherwise relieved, the arms of the spring element 58 separate the upper and lower clamping members so that the webbing 26 is again freely extendible from its stored position.

Having described our invention, we claim:

1. In a vehicle having a seat with a back, the combination comprising:
   (a) an elongated seat belt;
   (b) a coupling element carried on one end of the belt;
   (c) an elongated support mounted on the vehicle in an upright position adjacent the back of the seat;
   (d) a weight of a predetermined mass connected to the end of the belt opposite the coupling element, and mounted on the support to bias the belt toward a retracted position, the weight being movable along the support either in a first direction to move the belt toward its retracted position, or in the opposite, second direction to allow the belt to be extended from its retracted position;
   (e) a clamping member mounted on the support for motion toward a first position in which it is engageable with the belt to prevent the belt from being extended from its retracted position, and toward a second position in which it is inoperable to prevent motion of the belt, the clamping member being connected to the belt such that the belt biases the clamping member toward its first position at such times as the belt is extended from its retracted position; and
   (f) a bias member connected to the clamping member to bias the clamping member toward its second position, the bias member being so formed as to be yieldable to the bias of the belt on the clamping member at such times as the belt is extended from its retracted position in a predetermined motion.

2. The combination as defined in claim 1, in which the bias member is operable to return the clamping member toward its second position subsequent to a motion of the clamping member to its first position.

3. The combination as defined in claim 1, in which the elongated support comprises a tube supported in an upright position, the tube having an opening adjacent its upper end for receiving the belt into the tube, and the weight is suspended on the end of the belt in the tube so as to bias the extended end of the belt toward the opening and into the tube.

4. The combination as defined in claim 1, in which the support is enclosed within the back of the seat such that the belt can be extended from its retracted position to form a shoulder restraint.

5. The combination as defined in claim 1, including a roller rotatably mounted on the clamping member so as to be moved with the clamping member between its first and second positions, the roller being engageable with the belt such that the roller is biased by the belt in a direction transverse to its axis of rotation, and the clamping member being supported such that as the roller is moved by the belt in said transverse direction, the clamping member is moved toward its first position to engage the belt.

6. In a vehicle having a seat with a back, the combination comprising:
   (a) an elongated seat belt;
   (b) a coupling element carried on one end of the belt;
   (c) an elongated tubular support enclosed within the back of the seat, and supported in a generally upright position with its upper end adjacent the upper portion of the seat back;
   (d) a weight of a predetermined mass in the tubular support connected to the end of the belt opposite the coupling element such that the weight is suspended to bias the belt toward a retracted position in the tube, the weight being movable with respect to the tube in either a downward direction to move the belt toward its retracted position or an upward direction to allow the belt to be extended from its retracted position;
   (e) a clamping member mounted adjacent the tubular support for motion between a first position in which it is engageable with the belt to prevent the belt from being extended from its retracted position, and a second position in which it is inoperable to prevent motion of the belt, the clamping member being connected to the belt such that the belt biases the clamping member toward its first position as the belt is extended from its retracted position; and
   (f) a spring connected to the clamping member to bias it toward its second position, the spring being so formed as to allow the clamping member to be moved toward its first position by the belt at such times as the belt is moved from its retracted position in a predetermined motion, and to prevent the clamping member from being moved to its second position at such times as the belt is not being moved in said predetermined motion.

References Cited

UNITED STATES PATENTS

| 2,622,664 | 12/1952 | Koehler et al. | 244—122.2 X |
| 2,776,093 | 1/1957 | Cox et al. | 242—47.5 |
| 3,257,146 | 6/1966 | Mahoney | 297—388 |
| 3,287,062 | 11/1966 | Board et al. | 297—388 |
| 3,343,765 | 9/1967 | Baker | 242—107.4 |

LEO FRIAGLIA, *Primary Examiner.*

J. E. SIEGEL, *Assistant Examiner.*

U.S. Cl. X.R.

297—387, 388